United States Patent
Kröning et al.

(10) Patent No.: US 6,523,885 B2
(45) Date of Patent: Feb. 25, 2003

(54) DEFORMATION MEMBER

(75) Inventors: Achim Kröning, Paderborn (DE); Hui Wang, Paderborn (DE); Dariusz Straznikiewiecz, Paderborn (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/866,910

(22) Filed: May 29, 2001

(65) Prior Publication Data

US 2002/0017804 A1 Feb. 14, 2002

(30) Foreign Application Priority Data

May 29, 2000 (DE) ........................................ 100 26 402
May 28, 2001 (DE) ........................................ 101 26 065

(51) Int. Cl.⁷ ............................................. B62D 25/00
(52) U.S. Cl. .................... 296/189; 296/29; 296/203.02; 280/784
(58) Field of Search ........................... 280/784; 296/29, 296/194, 203.02, 204, 189; 293/155

(56) References Cited

U.S. PATENT DOCUMENTS

| 5,201,912 A | 4/1993 | Terada et al. ............... 293/120 |
| 5,785,367 A | 7/1998 | Baumann et al. ........... 293/133 |
| 5,853,195 A * | 12/1998 | Le et al. ..................... 280/784 |
| 6,003,934 A * | 12/1999 | Usui ....................... 296/189 X |
| 6,007,099 A | 12/1999 | Barthelemy et al. ........ 280/784 |

FOREIGN PATENT DOCUMENTS

| EP | 0 546 352 A1 | | 6/1993 | |
| GB | 624240 | * | 5/1949 | .................. 296/29 |
| SU | 996252 | * | 2/1983 | ................ 290/784 |

* cited by examiner

Primary Examiner—Dennis H. Pedder
(74) Attorney, Agent, or Firm—Henry M. Feiereisen

(57) ABSTRACT

The deformation member (1) is disposed between a longitudinal member (2) and a cross member (3) of a motor vehicle, with the cross member having a horizontal central longitudinal plane which is vertically offset to the horizontal central longitudinal plane of the longitudinal member (2). The deformation member includes an elongate, hollow base body (4) of polygonal cross section and a height which is greater than its width, and an upper and a lower reinforcing shell (14, 19) which are connected through welding to the base body (4) via the longitudinal edges of their legs (13, 18). The end walls of the lower reinforcing shell (19) are closed by cover plates (22, 24). The deformation member (1) can be coupled via a plate (23) with the longitudinal member (2) of the motor vehicle.

12 Claims, 4 Drawing Sheets

DEFORMATION MEMBER

The invention relates to a deformation member between a longitudinal member and a cross member of a motor vehicle, with the cross member having a horizontal central longitudinal plane which is vertically offset to the horizontal central longitudinal plane of the longitudinal member.

To satisfy the code for classification in a particular damage class of a motor vehicle insurance (e.g. according to the low-speed-test up to 16 km/h), the configuration of the front cross member system of a motor vehicle and especially the deformation members incorporated between the longitudinal member and the cross member are of particular importance. The deformation members should be so configured as to fully absorb loads encountered in the low-speed test and to rule out damage to the vehicle frame.

Optimum conditions for transforming impact energy in deformation energy exist in this context, when a deformation member is so configured and disposed as to form a quasi prolongation of a longitudinal member of the vehicle frame. This means in particular that the horizontal central longitudinal planes of the longitudinal member and the cross member extend in the same height level.

This ideal situation of a front cross member system of a motor vehicle is, however, oftentimes not present, when a motor vehicle, in particular a passenger car, is involved which has a weight of 2 tons or more. In these cases, the horizontal central longitudinal planes of the cross member and the longitudinal member are vertically offset to one another, primarily in such a manner that the central longitudinal plane of the cross member extends at a higher level than the central longitudinal plane of the longitudinal member. Upon introduction of impact forces into the cross member system, the vertical offset of the central longitudinal planes results in bending moments which adversely affect the deformation zone in the front portion. As a consequence, the cross member system has to be reinforced in order to absorb the bending moments. This, however, required heretofore comparably complicated and complex designs. These designs do not only lead to an increase in weight but also to higher productions costs.

U.S. Pat. No. 5,201,912 describes in this context a deformation element comprised of pipe portions and disposed between a longitudinal member and a cross member of a motor vehicle, with the cross member having a horizontal central longitudinal plane which is vertically offset to the horizontal central longitudinal plane of the longitudinal member. The pipe portions extend transversely within the cross member. In the event of a collision, the deformation members, supported by the longitudinal members, as well as the cross member itself should deform to convert the impact energy in deformation energy.

U.S. Pat. No. 5,785,367 discloses a deformation member at an end wall of the longitudinal member. This deformation member is substantially the cross member itself, with the cross member being traversed by an elongate U-shaped reinforcement member which is riveted to the box-like cross member.

U.S. Pat. No. 6,007,009 relates to the cross sectional configuration of cross members and the configuration of particular desired buckling areas which become effective in the event of a collision.

Finally, European Pat. No. EP 0 546 352 A1 discloses the application of welding joints as a classic joining method in automobile construction.

Based on the prior art, it is the object of the invention to provide a deformation member between a longitudinal member and a cross member, with the cross member having a horizontal central longitudinal plane which is vertically offset to the horizontal central longitudinal plane of the longitudinal member, wherein the deformation member is variable in design to allow easy adaptation to the respective type of vehicle and exhibits an optimum deformation behavior at slight weight while yet is easy to produce.

According to one aspect of the present invention, a deformation member is disposed between a longitudinal member and a cross member of a motor vehicle, with the cross member having a horizontal central longitudinal plane which is vertically offset to the horizontal central longitudinal plane of the longitudinal member, wherein the deformation member includes an elongate, hollow base body of polygonal cross section and a height which is greater than its width, and at least one reinforcing shell having U-shaped cross section and overlapping with the free longitudinal edges of its legs the base body in longitudinal direction of the base body and connected through welding to the base body via these longitudinal edges.

As central component of such a deformation element is an elongate, hollow base body of polygonal cross section and of a height which is greater than its width. Associated to this base body is at least one reinforcing shell having a U-shaped cross section and being dependent on the vehicle type involved, which reinforcing shell is so configured that the bending moments, encountered in the vertical central longitudinal plane as a consequence of the offset disposition of the horizontal central longitudinal planes of cross member and longitudinal member, are absorbed in an optimum manner. The reinforcing shell has legs whose longitudinal edges overlap the base body. The base body and the reinforcing shell are joined together by welding. Hereby, spot welding but also short longitudinal seams are sufficient for establishing a reliable connection. In particular the longitudinal edges are welded on the outside of the sidewalls of the base body. The extent of overlap of the legs with respect to the base body is determined by the respectively required deformation behavior. The base body and/or the reinforcing shell may be drawn or formed of compression molded parts. It is also possible to establish an optimal deformation behavior, even when the height-width ratio is very unfavorable, through variation of the sheet thickness in possible conjunction with the material (sheet steel and/or aluminum sheet). Hereby, in particular the transverse webs of the base body and the reinforcing shell are able to prevent the vertical legs of the base body and the reinforcing shell from collapse and the need for additional measures as a result of bead formation. The number of reinforcing shells to be associated to the base body in a quasi stack-like manner depends on the respective vehicle type and the deformation behavior. In any event, there is no need for additional mountings or reinforcing elements for compensating the height difference between the cross member and the longitudinal members. Still, the invention allows to reliably transform even great amounts of impact energy in deformation energy, because the deformation member can be supported not only by the longitudinal members but optionally also, for example, by the chassis subframe. The reinforcing shell can extend in precise parallel relationship to the base body or also in slanted relationship thereto. Moreover, the deformation behavior can be influenced by a different height of the legs of the reinforcing shell.

According to another feature of the present invention, the base body has a top and a bottom which are each embraced by at least one U-shaped reinforcing shell. In this manner, essentially three channels, arranged above one another, with a total of four cross webs are created as reinforcements.

The slanted disposition of the cross member confronting end walls of the deformation member realizes an even better force transfer from the cross member to the deformation member. The reason being the fact that not all areas of the end walls are impacted at a same time in the event of a crash, but initially only the corner zone neighboring the cross member, before the areas lying behind in the direction of a longitudinal member are deformed. Hereby, a slanted disposition of the end walls is conceivable in the vertical plane as well as in the horizontal plane. Further, a combined application of both configurations is possible.

When the deformation member is made up of a base body and two further reinforcing shells, it follows that in the event of a crash, for example, at first the upper reinforcing shell, then the base body and lastly the lower reinforcing shell are exposed to strain, and thus deformation is implemented with increasing resistance.

The base body may be formed in one piece from a drawn rectangular hollow section. However, to make the base body from two U-shaped shells which are joined together through welding via the longitudinal edges of their confronting legs. In this case, it is advantageous, when the longitudinal edges of a shell are inwardly recessed by about a sheet thickness so that the outer surfaces of top shell and bottom shell extend each in a vertical plane except for the overlap zone of the longitudinal edges.

A further advantageous embodiment of the invention to form the base body by a lower U-shaped shell and an upper trapezoidal shell. Also in this case, the longitudinal edges of the confronting legs of the shells are joined together by welding. As a consequence of the inclination of the cross web of the upper trapezoidal shell, the support of the vertical legs is not impaired. However, the added advantage is attained that the resistance increases even more uniformly over the length of the deformation member, when a force is introduced into the deformation member.

Finally, it is conceivable that the cross member confronting end walls of the base body and of each reinforcing shell are provided with a cover plate. The arrangement of the cover pate across the entire front cross section of the deformation member provides an additional improved force introduction from the cross member into the deformation member.

Exemplified embodiments of the invention will now be described in more detail with reference to the drawing in which.

Figure 1:
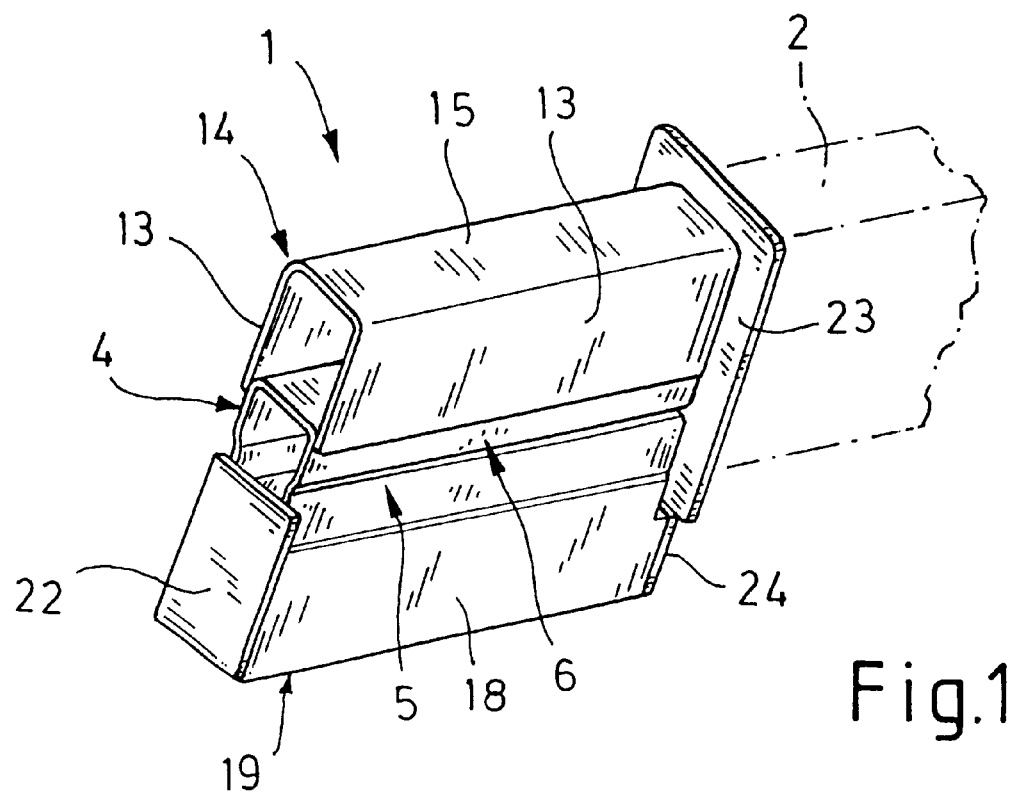
FIG. 1 shows a schematic perspective illustration of a deformation member for a motor vehicle.
Figure 2:
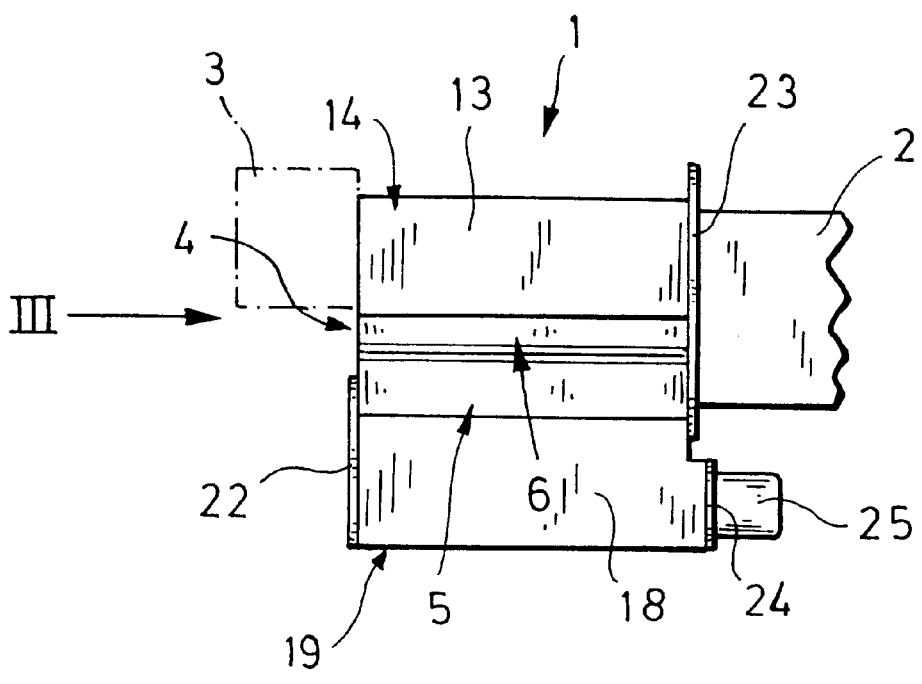
FIG. 2 shows a side view of the deformation member of FIG. 1 in schematic relationship to a longitudinal member and a chassis subframe of the motor vehicle.
Figure 3:
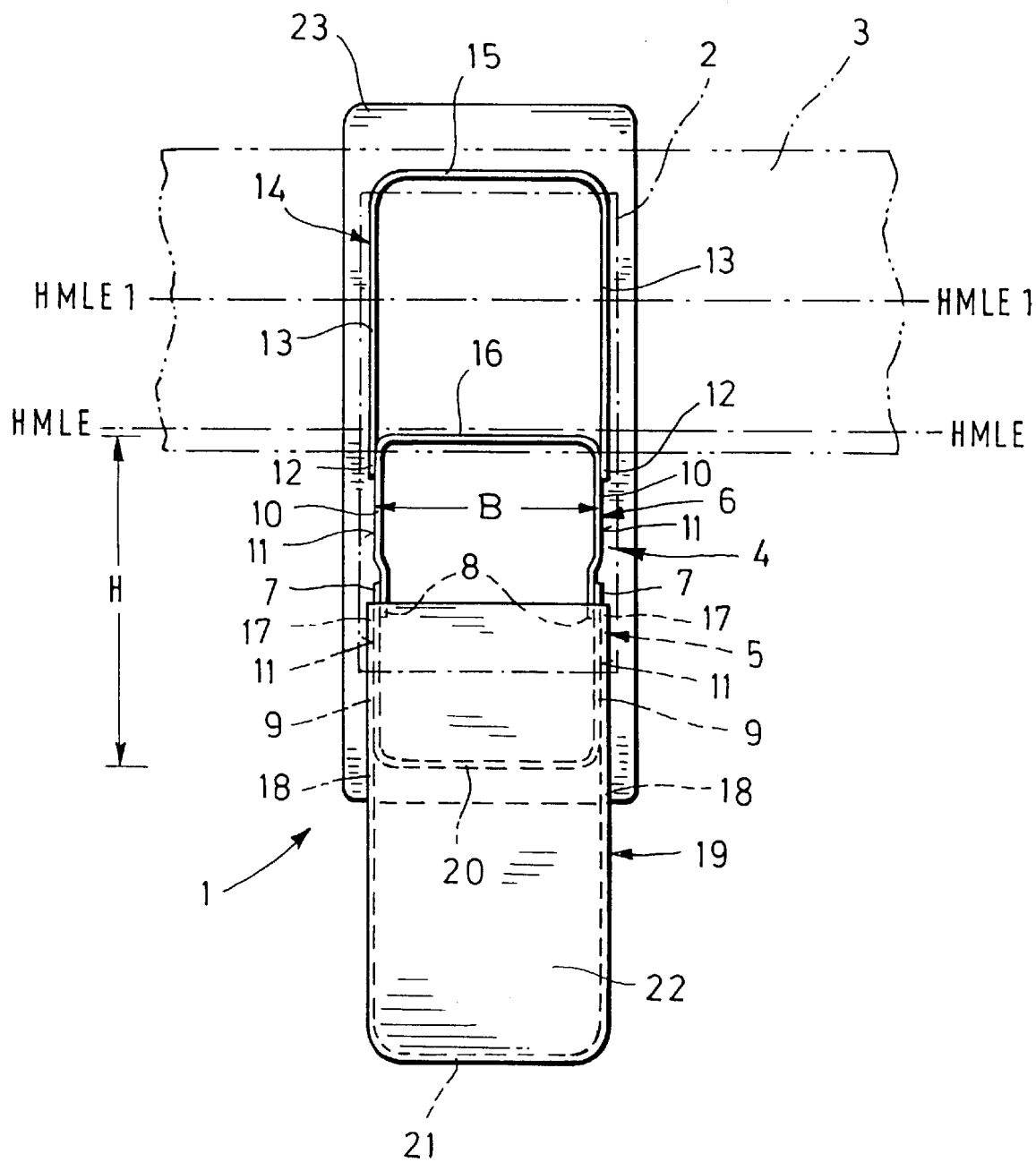
FIG. 3 shows an enlarged front view of the deformation member of FIG. 2 in the direction of arrow III.

Reference numeral 1 designates in FIGS. 1 to 3 a deformation member arranged in a motor vehicle between a longitudinal member of the vehicle frame and a cross member, in order to convert impact energy in deformation energy and thus to protect the vehicle frame from damage within the so-called low-speed range of up to 16 km/h.

The deformation member 1 is installed between such a longitudinal member 2 and a cross member 3, with their horizontal central longitudinal planes HMLE and HMLE1 (as shown schematically in FIG. 3) arranged in vertical offset relationship. In the exemplified embodiment, the horizontal central longitudinal plane HMLE1 of the cross member 3 is arranged above the horizontal central longitudinal plane HMLE of the longitudinal member 3.

The deformation member 1 includes a base body 4 of rectangular cross section with a height H that is greater than its width B (FIG. 3). The base body 4 is comprised of a U-shaped bottom shell 5 and a U-shaped top shell 6, which are joined together through spot welding via the longitudinal edges 7, 8 of their confronting legs 9, 10. As can be seen, the longitudinal edges 8 of the top shell 6 are recessed inwardly by about the wall thickness of the legs 10, so that the outer sides 11 of the legs 9, 10 of the bottom shell 5 and the top shell 6 extend in the same vertical planes.

The top shell 6 of the base body 4 are embraced by the longitudinal edges 12 of the legs 13 of a U-shaped reinforcing shell 14 which extends in longitudinal direction of the base body 4. The longitudinal edges 12 of the legs 13 are connected through sport welding with the legs 10 of the top shell 6. The web 15 interconnecting the legs 13 of the reinforcing shell 14 extends parallel to the web 16 interconnecting the legs 10 of the top shell 6.

The bottom shell 5 of the base body 4 is also embraced by longitudinal edges 17 of the legs 18 of a U-shaped reinforcing shell 19. The longitudinal edges 17 are welded to the legs 9 of the bottom shell 5. Also the web 20 interconnecting the legs 9 of the bottom shell 5 extends parallel to the web 21 interconnecting the legs 18 of the lower reinforcing shell 19.

The end wall area of the deformation member 1 beneath the cross member 3 is substantially closed by a cover plate 22. The cover plate 22 is welded to the base body 4 as well as to the lower reinforcing shell 19.

As is further shown in FIGS. 1 to 3, a plate 23 is disposed at the longitudinal member 2 confronting end wall of the deformation member 1 at a level of the upper reinforcing shell 14, the base body 4, and the legs 18 of the lower reinforcing shell 19, and welded to these components. The plate 23 connects the deformation member 1 with the longitudinal member 2, e.g. via a detachable connection, e.g. bolted connection. The longitudinal member 2 is only shown schematically in the Figures. The connection between the deformation member 1 and the cross member 3 may be realized through welding.

The end wall of the lower reinforcing shell 19, facing away from the cover plate 22 on the side of the cross member 3, is also closed by a cover plate 24 which is welded to the reinforcing shell 19. The deformation member 1 is supported via the cover plate 24 by the longitudinal member 2 as well as by the chassis subframe 25, shown only schematically.

Figure 4:
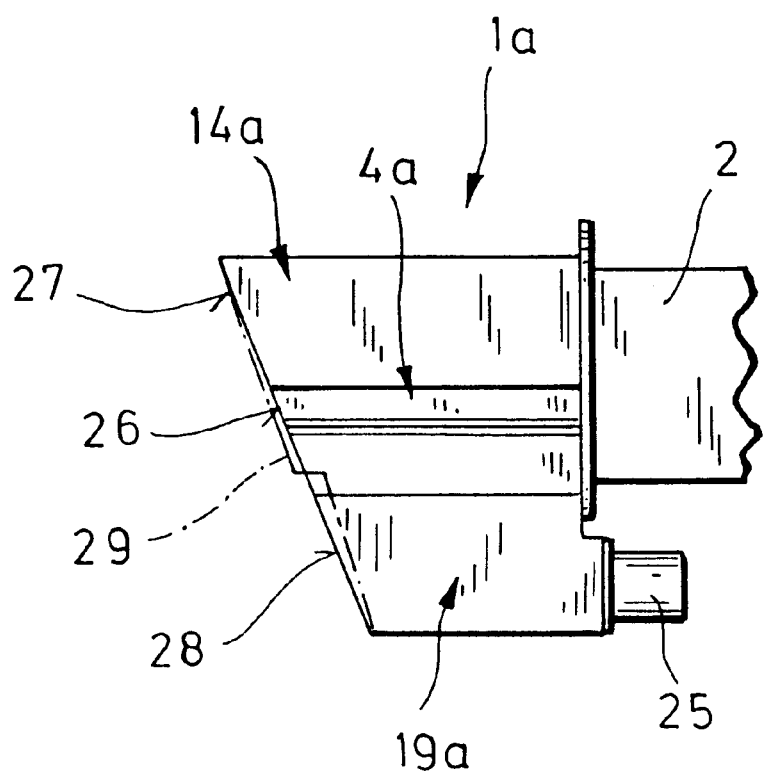
FIG. 4 is an illustration corresponding to the one of FIG. 2 in accordance with a further embodiment.

Unlike the embodiment of FIGS. 1 to 3, in the deformation member 1a of FIG. 4 the longitudinal member 2 distal end wall 26 of the base body 4a, as well as the end walls 27, 28 of the reinforcing shells 14a, 19a are inclined. This inclination may be configured evenly, or, also stepped, as indicated by dashdot line 29.

Otherwise, the embodiment of FIG. 4 corresponds to the one of FIGS. 1 to 3, so that a repeated explanation is not necessary.

Figure 5:
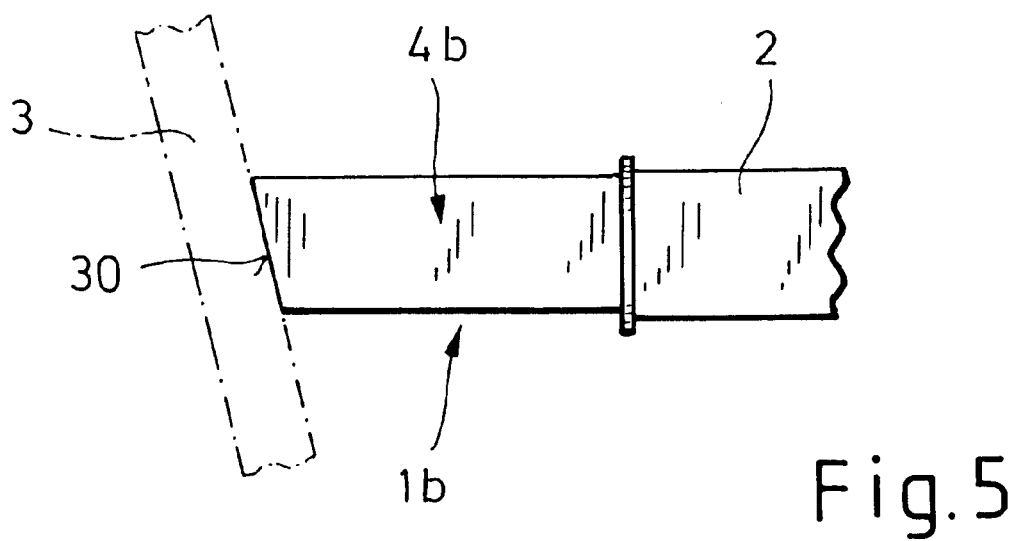
FIG. 5 is a plan view of a third embodiment of a deformation member.

FIG. 5 depicts a plan view of a deformation member 1b in which the end wall 30 of the base body 4b, which end wall faces a cross member 3, is slanted to one side. This slanted end wall 30 may also be used in the embodiment of FIGS. 1 to 3 or in the embodiment of FIG. 4.

Figure 6:
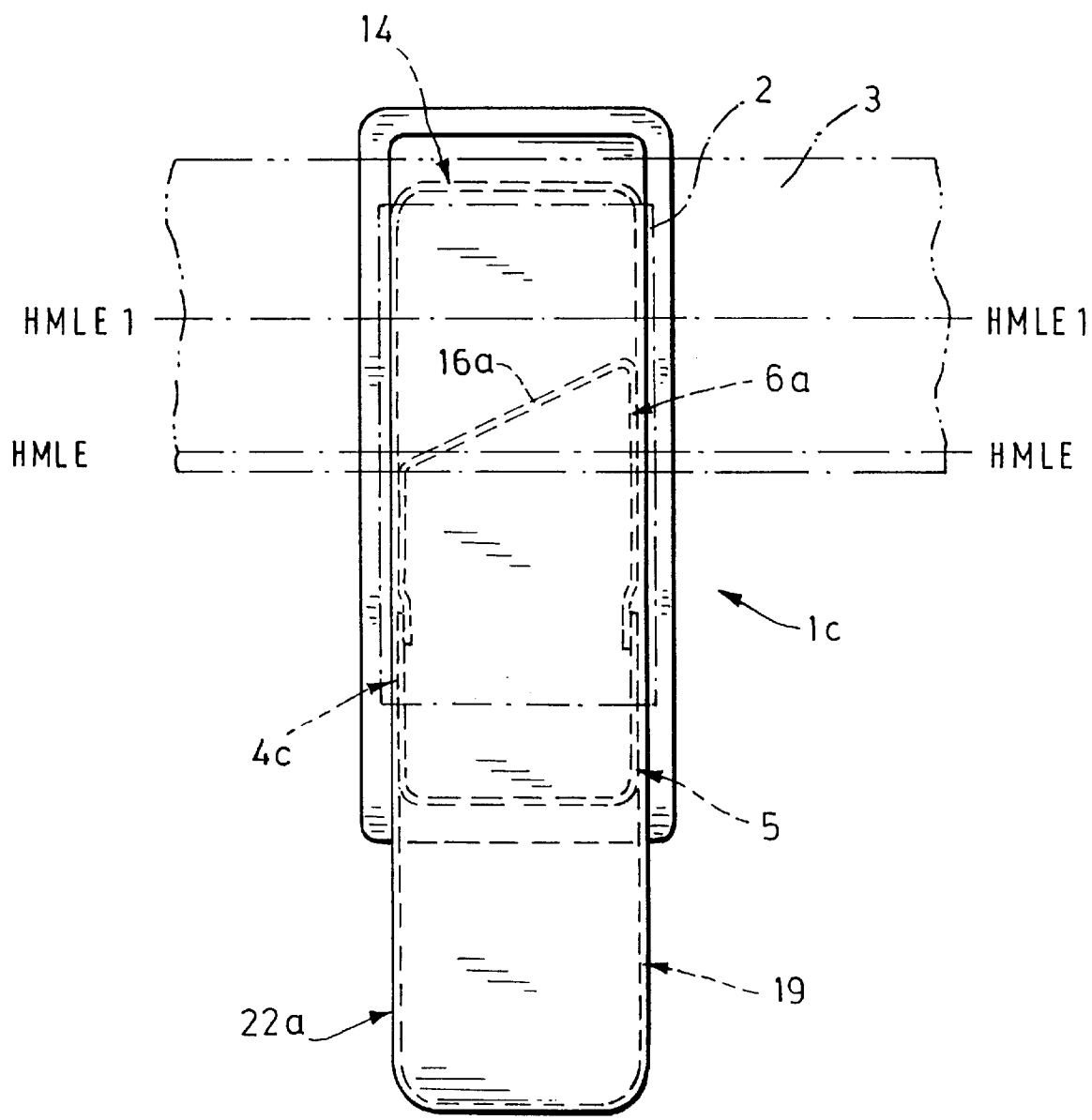
FIG. 6 is an illustration corresponding to the one of FIG. 3 in accordance with two more embodiments.

FIG. 6 shows an illustration corresponding to the one of FIG. 3, with the difference being that the upper web 16a of the upper shell 6a of the base body 4c is slanted.

Furthermore, FIG. 6 shows that the cover plate 22a, provided on the side of the cross member of the deformation member 1c, extends over the entire height of the deformation member 1c. This cover plate 22a can also be associated to the embodiments indicated in FIGS. 4 and 5.

Otherwise, the illustration of FIG. 6 corresponds to the one of FIG. 3, so that a repeated explanation can be omitted.

LIST OF REFERENCE CHARACTERS 1 deformation member
1a deformation member 1b deformation member
1c deformation member
2 longitudinal member
3 cross member
4 base body of 1
4a base body of 1a
4b base body of 1b
4c base body of 1c
5 bottom shell of 4, 4a–c
6 top shell of 4, 4a–c
6a top shell of 4c
7 longitudinal edges of 9
8 longitudinal edges of 10
9 legs of 5
10 legs of 6, 6a
11 outer sides of 9, 10
12 longitudinal edges of 13
13 legs
14 upper reinforcing shell
14a upper reinforcing shell
15 web of 14
16 web of 6
16a web of 6a
17 longitudinal edges of 18
18 legs of 19
19 lower reinforcing shell
19a lower reinforcing shell
20 web of 5
21 web of 19
22 cover plate of 1
22a cover plate of 1c
23 plate
24 cover plate of 1
25 chassis subframe
26 end wall of 4a
27 end wall of 14a
28 end wall of 19a
29 dashdot line in FIG. 4
30 end wall of 4b
B width of 4, 4a, 4b, 4c
H height of 4, 4a, 4b, 4c
HMLE horizontal central longitudinal plane of 2
HMLE1 horizontal central longitudinal plane of 3

What is claimed is:

1. A deformation member intended for a motor vehicle, comprising:

an elongate, hollow base body having a polygonal cross section and defined by a height which is greater than a width of the base body; and at least one reinforcing shell having a U-shaped cross section to thereby define spaced-apart legs interconnected by a transverse web, with the legs having free longitudinal edges for placement over the base body in longitudinal direction of the base body such that the legs extend vertically and the web extends horizontally, wherein the reinforcing shell is connected to the base body by welding the longitudinal edges to the base body, wherein the base body includes a lower U-shaped shell and an upper shell having an upper web of slanted configuration, each of the shells defining legs having free longitudinal edges, wherein the shells are joined together by welding the longitudinal edges of one of the shells to the longitudinal edges of the other one of the shells.

2. A deformation member intended for a motor vehicle, comprising:

an elongate, hollow base body having a polygonal cross section and defined by a height which is greater than a width of the base body;

a first reinforcing shell having a U-shaped cross section to thereby define spaced-apart legs having free longitudinal edges for placement over the base body in longitudinal direction of the base body, wherein the reinforcing shell is connected to the base body by welding the longitudinal edges to the base body; and a second said reinforcing shell, wherein the base body has a top embraced by one of the reinforcing shells, and a bottom embraced by the other one of the reinforcing shells.

3. The deformation member of claim 1, wherein the base body and the reinforcing shell have each an end wall of slanted configuration.

4. The deformation member of claim 1, wherein the base body includes two U-shaped shells, each of the shells defining spaced-apart legs having free longitudinal edges, wherein the shells are joined together by welding the longitudinal edges of one of the shells to the longitudinal edges of the other one of the shells.

5. The deformation member of claim 3, wherein at least one of the end wall of the base body and the end wall of the reinforcing shell is provided with a cover plate.

6. The deformation member of claim 4, wherein the legs of one of the shells of the base body is inwardly recessed so as to substantially realize an alignment of confronting legs of the shells in a vertical plane.

7. The deformation member of claim 2, and further comprising a mounting plate secured to the base body and the reinforcing shells at a side facing the longitudinal member for attachment of the deformation member to the longitudinal member.

8. The deformation member of claim 2, wherein the base body and the first and second reinforcing shells have each an end wall of slanted configuration.

9. The deformation member of claim 2, wherein the base body includes two U-shaped shells, each of the shells defining spaced-apart legs having free longitudinal edges, wherein the shells are joined together by welding the longitudinal edges of one of the shells to the longitudinal edges of the other one of the shells.

10. The deformation member of claim 2, wherein the base body includes a lower U-shaped shell and an upper trapezoidal shell, each of the shells defining legs having free longitudinal edges, wherein the shells are joined together by welding the longitudinal edges of one of the shells to the longitudinal edges of the other one of the shells.

11. The deformation member of claim 8, wherein at least one of the end wall of the base body and the end wall of the first and second reinforcing shells is provided with a cover plate.

12. The deformation member of claim 9, wherein the legs of one of the shells of the base body is inwardly recessed so as to substantially realize an alignment of confronting legs of the shells in a vertical plane.

* * * * *